US007110962B2

(12) United States Patent
Amon et al.

(10) Patent No.: US 7,110,962 B2
(45) Date of Patent: Sep. 19, 2006

(54) APPARATUS AND METHOD FOR PROVIDING A PROVIDER-SELECTED MESSAGE IN RESPONSE TO A USER REQUEST FOR USER-SELECTED INFORMATION

(76) Inventors: Thomas C. Amon, 2401 N. Fairmont, Santa Ana, CA (US) 92706; Dan M. Baer, 417 E. 22nd St., Santa Ana, CA (US) 92706

( * ) Notice: Subject to any disclaimer, the term of this patent is extended or adjusted under 35 U.S.C. 154(b) by 638 days.

(21) Appl. No.: 10/001,761

(22) Filed: Oct. 31, 2001

(65) Prior Publication Data

US 2004/0111463 A1 Jun. 10, 2004

Related U.S. Application Data

(63) Continuation of application No. 08/912,991, filed on Aug. 11, 1997, now abandoned.

(51) Int. Cl.
*G06Q 30/00* (2006.01)
*G06F 15/16* (2006.01)

(52) U.S. Cl. .......................................... 705/14; 709/219

(58) Field of Classification Search ................. 705/14, 705/10; 709/227, 219, 203
See application file for complete search history.

(56) References Cited

U.S. PATENT DOCUMENTS

| 5,305,195 A | | 4/1994 | Murphy ........................ 364/401 |
| 5,347,632 A | | 9/1994 | Filepp et al. ................. 398/200 |
| 5,572,643 A | * | 11/1996 | Judson ......................... 709/218 |
| 5,657,390 A | * | 8/1997 | Elgamal et al. .............. 713/151 |
| 5,708,780 A | * | 1/1998 | Levergood et al. .......... 709/229 |
| 5,724,521 A | * | 3/1998 | Dedrick ......................... 705/26 |
| 5,732,219 A | | 3/1998 | Blumer et al. ........... 395/200.57 |
| 5,745,681 A | | 4/1998 | Levine et al. ............ 395/200.3 |
| 5,751,956 A | | 5/1998 | Kirsch .................... 395/200.33 |
| 5,761,683 A | | 6/1998 | Logan et al. ................. 707/513 |
| 5,848,396 A | | 12/1998 | Gerace ........................... 705/10 |
| 5,875,296 A | | 2/1999 | Shi et al. ................. 395/188.01 |
| 5,878,213 A | * | 3/1999 | Bittinger et al. ............. 709/203 |
| 5,933,811 A | * | 8/1999 | Angles et al. ................. 705/14 |
| 5,937,392 A | * | 8/1999 | Alberts .......................... 705/14 |
| 5,948,061 A | | 9/1999 | Merriman et al. ........... 709/219 |
| 5,974,451 A | * | 10/1999 | Simmons ..................... 709/218 |
| 6,134,592 A | | 10/2000 | Montulli ...................... 709/229 |
| 6,148,332 A | * | 11/2000 | Brewer et al. ............... 709/218 |
| 6,195,649 B1 | | 2/2001 | Gifford .......................... 705/75 |

FOREIGN PATENT DOCUMENTS

| WO | WO 96/39668 | | 12/1996 |
| WO | WO97/21183 | * | 6/1997 |

OTHER PUBLICATIONS

Answers.com; intersitial ad and Supersitial; Oct. 26, 2005.*
Keane, Patrick. In the Face of Shrinking Nielson Ratings, Major Television Networks Need to Re-Evaluate Online Goals. www.jupiter.com. Jun. 2, 1997.

(Continued)

*Primary Examiner*—Dung C. Dinh
*Assistant Examiner*—Sean Reilly
(74) *Attorney, Agent, or Firm*—Vista IP Law Group LLP

(57) ABSTRACT

A method of delivering information across a computer network includes receiving a request from a client program for user-selected information, and transmitting provider-selected information in response to the request if no qualifying provider-selected message has been previously transmitted to the client program.

11 Claims, 2 Drawing Sheets

OTHER PUBLICATIONS

Figure 1:
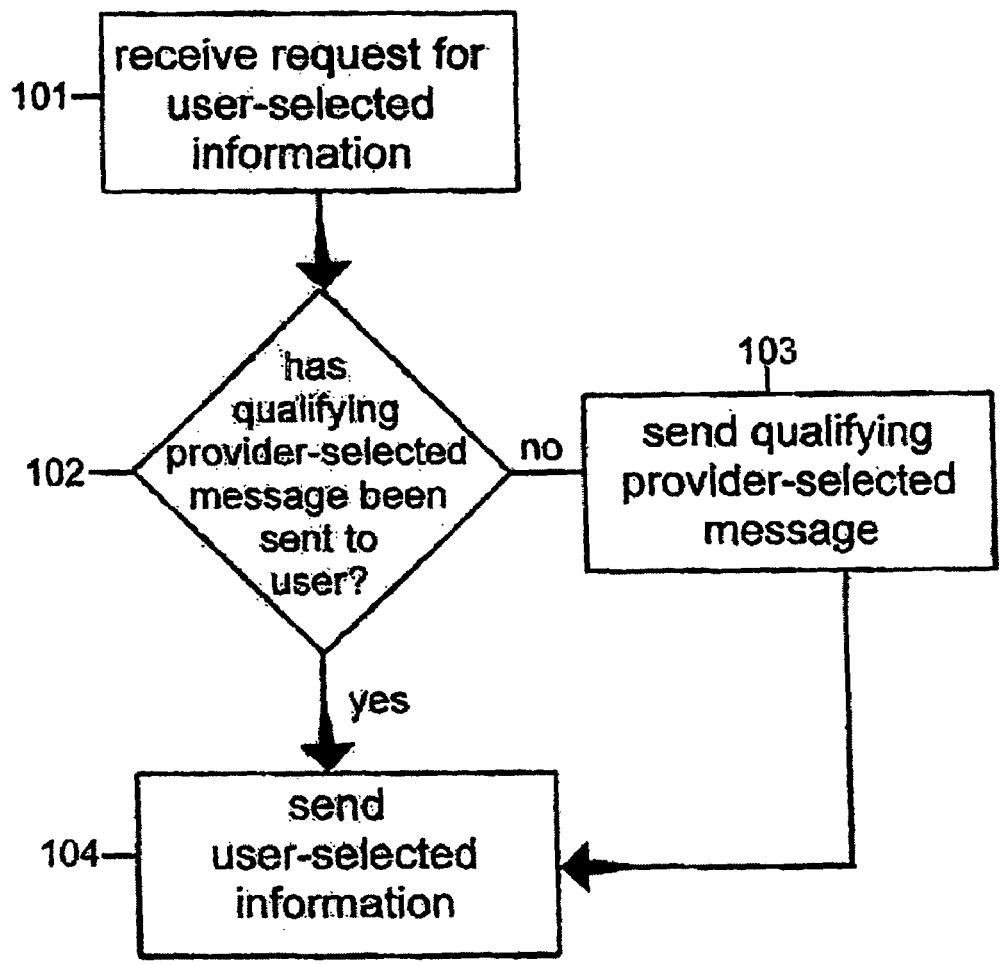

Lemos, Robert. Web Advertising's Future: Users in Limbo. ZDNN. Jun. 27, 1997.

Lemos, Robert. Web Surfers Cruising By Boring Banner Ads. ZDDN. Jun. 11, 1997.

Interstitial Advertising. Apr. 10, 1997. www.nytimes.com/library/cyber/week/041997.html.

Boudette, Laura. Europe waits in anticipation of E-advertising boom. ZDNN. Jun. 5, 1997.

Company Information concerning Narrative Communications. www.narrative.com. 1997.

Java Fuels New Ads. Internet World. Dec. 1997.

Beatty, Sally Goll. Knock, Knock! Who's There? More Noisy New Internet Ads. Wall Street Journal Interactive Edition. Sep. 3, 1997.

Made-Over AOL-looks more like T.V. Register News Service. Oct. 7, 1997.

AOL 1996 Annual Report. AOL service. 1997.

Richtel, Matt. TV-Type Ads Emerge on the Web. The New York Times. CyberTimes. Apr. 19, 1997.

Bezerk awards AT&T free interstitial ad in "You don't know jack the netshow" trivia tournament. www.berzerk.com. Mar. 5, 1997.

Don't be left out in the cold . . . It's time to go bezerk! www.berzerk.com. Dec. 3, 1996.

The Web Advertising Market. FlyCast Communications Corp. press releases on the web. www.flycast.com. 1997.

FlyCast Selects Marimba's Castanet to Bring First Real-Time, Jave-Based Web Advertising Campaign Management Solutions to Ad Agency Desktops. Flycast Press Release on the Web. www.flycast.com. Aug. 4, 1997.

Pushing Push: Advancing the Features of Channel Communications. Intermind Corporation, www.intermind.com. Sep. 8, 1997.

About Intermind's Channel Communications Patents. Intermind Corporation, www.intermind.com. Dec. 19, 1997.

The New York Times on the Web, Thursday, Sep. 7, 2000 issue, www.nytimes.com, front page, sign in page, Late News page, Sep. 2000.

The New York Times on the Web, "Privacy Information", www.nytimes.com/subscribe/help/privacy.html, 2000.

The New York Times on the Web, "Frequently Asked Questions About Cookies" www.nytimes.com/subscribe/help/cookies.html, 2000.

Hodges, Jane, "N.Y. Times sets an aggressive Web plan", Advertising Age, Midwest region edition, vol. 67, issue 4, Jan. 22, 1996, p. 26, Jan. 1996.

Foster, Can mixing 'cookies' with online marketing be a recipe for heatburn?, Jul. 22, 1996, InfoWorld, Framingham, vol. 18, Issue 30, pp. 54ff.

Taylor, Going beyond the banner, Jul. 8, 1996, Brandweek, New York, vol. 37, Issue 28, pp. 122ff.

Kohda, Ubiquitous Advertising on the WWW: Merging Advertisement on the Browser, Computer Networks and ISDN Systems, North Holland Publishing. Amsterdam, NL, vol. 28, May 1996.

\* cited by examiner

APPARATUS AND METHOD FOR PROVIDING A PROVIDER-SELECTED MESSAGE IN RESPONSE TO A USER REQUEST FOR USER-SELECTED INFORMATION

This application is a continuing application of Ser. No. 08/912,991, filed on Aug. 11, 1997, now abandoned. Priority to the aforementioned application is hereby expressly claimed in accordance with 35 U.S.C. § 120 and any other applicable statutes, and said application is hereby incorporated herein by reference.

BACKGROUND

Internet information services differ in a number of ways from traditional broadcast services such as television and radio. These differences make it much more difficult for the internet information services provider to attract the attention of the internet user to messages that the internet user has not actively sought, such as commercially sponsored messages, than has been the case with traditional broadcast services.

One such difference is that the internet user normally controls the channel to her receiving equipment, typically a computer. The internet user therefore may play an active role in selecting information resources transmitted. In contrast, in traditional broadcast media, the user has no control at all over the channel, and may select information resources only by receiving or not receiving (such as by changing the channel) information placed on the channel by the broadcaster.

Further, in traditional broadcast media, transmissions are often used by the recipient without the assistance of content storage or processing equipment, which might permit the user to avoid or minimize exposure to unwanted or uninteresting information from the transmission. The user of traditional broadcast media therefore generally cannot direct his or her attention only to desired portions of the transmission without interrupting the viewing process. The user therefore normally views most or all information intended for the viewer by the broadcaster while viewing a broadcast. The user's viewing process is substantially under the control of the broadcaster.

For example, a traditional broadcast typically includes programming to induce users to tune the broadcast channel. In order to derive revenue from the broadcast, the broadcaster typically intersperses commercial sponsored messages, which the user may not desire to view, with the programming which the viewer seeks. Because the user does not control the channel, the user has no choice but to receive commercial messages interspersed with the program while tuned to the channel. If the program is viewed as received, the viewer further must either view such commercial messages or interrupt viewing the channel altogether, perhaps by tuning another channel.

Internet users, unlike broadcast users, may exercise control over the channel to their receiver. Unlike a broadcast, in which a stream of information is transmitted without regard to any user's desire to receive it, interact information is typically transmitted only in response to a request.

Like broadcasters, internet information providers often desire to intersperse commercially sponsored messages with information sought by users, hoping to induce users to view the commercially sponsored messages along with user-selected information. However, internet users receive requested information in digital form and store and/or process some or all of the requested information on computers before or during the viewing process. As a result, internet information providers typically exercise far less control over the viewing process than do broadcasters, and unwanted or uninteresting content may be easily ignored or avoided by the internet user. It is thus more difficult for internet information providers to effectively deliver commercially sponsored messages to internet users than for traditional broadcasters.

For example, internet search service providers often display so-called banner advertisements on the same page with search results. Experience has shown, however, that search service users often focus only on retrieved search results and ignore displayed banner advertisements.

For the foregoing reasons, there is a need for an improved internet massaging system that permits the internet information provider greater control over the user's viewing process of provider-selected messages, without otherwise interfering with the viewing process of user-selected information.

SUMMARY

The present invention is directed to an improved Internet massaging system that satisfies the need for providing the internet information provider greater control over the viewing process of provider-selected messages. The system comprises an apparatus and method for providing a provider-selected message in response to a user request for user-selected information.

An object of the present invention is to provide a method and apparatus for conveying information to the internet user that the user has not selected interspersed with information that the user has selected in such a way that the user has difficulty ignoring or avoiding such unselected information without interrupting the viewing process.

A further objective of the present invention is to provide a method and system for substantially controlling the viewing process during the display of a time-delimited provider-selected message as a prerequisite to permitting the user to retrieve user-selected information.

A further objective of the present invention is to monitor the transmission of user-selected information to a user, and to intersperse provider-selected information with user-selected information at intervals under the control of the information service provider.

These and other objectives are accomplished by the present invention.

A system having the features of the present invention comprises an internet server for receiving a user request for user-selected information, and for determining if a qualified provider-selected message has previously been transmitted to the user. The server transmits provider-selected information (such as a commercial message) in response to the user request if no qualifying provider-selected message has been previously transmitted to the user.

Such a system may further comprise a provider-selected message which causes the user's computer to automatically again request the user-selected information that resulted in transmission of the provider-selected message, after an appropriate display interval. Such a provider-selected message may be a qualifying provider-selected message, in which case the automatic request for user-selected information will result in the transmission of the originally sought user-selected information. During the display interval, the provider may substantially control the user's client program.

DETAILED DESCRIPTION OF THE INVENTION

A method and system for interspersing messages not selected by the user with user-selected messages is disclosed.

Internet information services are typically provided via client/server programs, in which a client program executing on a user's computer is used to request information services from a server program executing on an information service provider's computer. In one popular method, information and requests are transmitted via the so-called HyperText Transport Protocol ("HTTP"). Users' HTTP client programs are typically known as "browsers" and commercial embodiments are available from Netscape and Microsoft, among others. HTTP server programs operated by information service providers respond to users' browsers' HTTP requests. Commercial HTTP server embodiments (frequently referred to as "web servers") are available from Microsoft and Netscape, and royalty-free embodiments are available from NCSA, CERN and Apache.

In addition to sending HTTP requests and receiving HTTP responses from servers, typical browsers parse certain classes of such responses, including Standardized General Markup Languages, most commonly including Hypertext Markup Language ("HTML"). In addition, many common browsers can parse and execute program code transmitted in HTTP responses. For example, two programming languages commonly executed by browsers are SunSoft's Java and Netscape's JavaScript.

HTTP requests and responses frequently include a wide variety of information, often in conjunction with user-requested information. Such other information is often transmitted in HTTP header fields. Such header fields are generally of four types: General Headers, Request Headers, Response Headers and Entity Headers.

General Headers may include such information as, for example, the transfer-encoding scheme. Request Headers may include such information as, for example, encoding schemes the client program can accept, name=value pairs known as "cookies", or the "referrer" or URL of the document containing the link selected by the user to cause the browser to request the requested document. Response Headers may include such information as, for example, the age of the requested document or a "Set-Cookie" header used to define cookie name=value pairs. Entity Headers may include such information as, for example, the content encoding scheme, content length or a message digest such as MD5. More comprehensive descriptions of commonly used headers appear in RFC 1945 and Wong, Web Client Programming with Perl (1997, O'Reilly & Associates, Inc.)

Browser and other HTTP clients address information with Universal Resource Locators ("URL"s). HTML documents generally contain user-selectable references to such URL references, along with hypertext or graphical labels for the user-selectable reference or "link." HTML provides a markup token or tag known as an anchor, which links a displayed image or text segment with a URL so that when a user selects the linked image or text (the "link"), the browser client causes the computer to transmit an HTTP request for the information referenced by the linked URL. Some systems permit users to store links locally as "bookmarks," allowing a user to go directly to "bookmarked" pages without directly entering a URL or selecting a link on a transmitted page.

Prior art forms of commercial massaging have included placing advertisements such as the rectangular so-called "banner ad" on an RTML page with user-selected information, or providing an HTML page containing advertisements with a link to a page containing user-selected information. In the case of a banner ad, because the user-selected page contains both information sought by the user and provider-selected information not sought by the user, the user may ignore the provider-selected information not sought and direct her attention only to the information sought. In the case of an intermediate link, the user may simply enter the URL of the user-selected page directly, or "bookmark" the page, and thus entirely bypass the commercial message when the user returns to the page.

In the present invention, a user selecting a link does not receive user-selected information unless the information provider's server determines that the user has previously received a qualifying provider-selected message. The provider-selected message need not contain any user-selected information, and is thus substantially under the control of the provider. Nevertheless, because the server will not permit the user to retrieve user-selected content unless the user has previously received a qualiyig provider-selected message, the user who sufficiently desires user-selected information available from the provider will nevertheless receive and likely will view provider-selected information.

A provider-selected message may be any form of message capable of transport via computer network, including any form of message capable of transport via the HTTP protocol. Because the provider-selected message display need not contain user-selected information, the provider-selected display is substantially under the control of the information provider.

State information sufficient to determine whether a given user has previously received a qualifying provider-selected message may be maintained by the information provider or by the user, or both.

For example, a user request may contain sufficient information for a server which maintains no state information for the requesting user to determine that the user has previously received a qualifying provider-selected message. One such user request is an HTTP request including a cookie indicating the time and nature of the last provider-selected message received by the user's browser. Such a request would permit the provider's server to determine if the user had received a provider-selected message which was qualifying because, for example, the user had received a commercially sponsored message within the last one-half hour. A user frequently requesting information from such a server would receive a commercially sponsored message every one-half hour.

Alternatively, the state information could be divided between the user and the provider. For example, a user request could contain sufficient information for the provider only to identify the user, and all other state information relating to that user could be maintained by the provider. One such user request is an HTTP request including a cookie name/value pair assigning a unique number to each separate browser by the server. Using the identification number, the provider's server could access a database containing information about the user, such as the time and nature of the last provider-selected message transmitted to the user. One such embodiment utilizes Microsoft Internet Information Server's Active Server Page technology to set a unique cookie for each user and to associate a session variable with each user indicating the time that the user last received a qualifying provider-selected message. Based on such information, the server could permit the user to retrieve user-selected information only if, for example, the user had received a commercially sponsored message in the last one-half hour.

Alternatively, all state information may be maintained by the provider. For example, a provider's server could maintain a database of provider-selected messages transmitted in the last one-half hour and the network addresses of the machines and programs that received those messages. If a user request is received from a network address on the list, user-selected information would be transmitted in response. Otherwise, a provider-selected message would be transmitted in response.

One method for practicing the present invention is shown in FIG. 1. In step 101, the internet information server receives a user request for user-selected information. In step 102, the server determines the qualification state of the requestor using state information available to the server at the time that the server responds to the request, such as the state information described above. If the server determines in step 102 from the available state information that no qualifying provider-selected message has previously been sent to the requestor, then the server performs the step 103 of sending a qualifying provider-selected message to the requestor. The server then performs the step 104 of sending the requested user-selected information to the requestor. If the server determines in step 102 that a qualifying provider-selected message has previously been sent to the requester, then the server may perform step 104 after step 101 without performing step 103 in the interim.

In a preferred embodiment, request information is structured so as to inhibit a user from falsely indicating that she has fulfilled the provider's requirements for access to user-selected information.

Qualification conditions may be dynamic, and are determined at the time that the server responds to a user request. For example, a qualifying interval in the above example might be one-half hour from midnight to five o'clock p.m. and then change automatically to fifteen minutes from five o'clock p.m. to midnight. Alternatively, a qualifying interval might vary based on other information available to the server, such as the user's browser program type, or user information maintained by the server.

User-selected information can only be accessed by a user who receives messages substantially under the control of the provider of the user-selected information at intervals and on conditions under the continuous control of the provider.

FIG. 1 schematically depicts one embodiment of the present invention. An internet information server 101 is provided, which may comprise, for example, an IBM compatible computer containing an Intel pentium chip, running the Microsoft Windows NT operating system and Microsoft Internet Information Server HTTP server software. The server is connected by means of a network adapter to a local computer network 103, which is in turn connected to the Internet 104. A user computer 102 is also depicted, which may comprise, for example, an IBM compatible computer containing an Intel pentium chip, running the Microsoft Windows 95 operating system and Netscape Navigator HTTP browser client software. The user computer is connected by means of a network adapter to a local computer network 105, which is in turn connected to the Internet 104. By means of the local computer networks 103 and 105 and the Internet 104, the interact information server 101 accepts requests from the client program running on user computer 102 and delivers information to the client program in response to such request.

Figure 2:
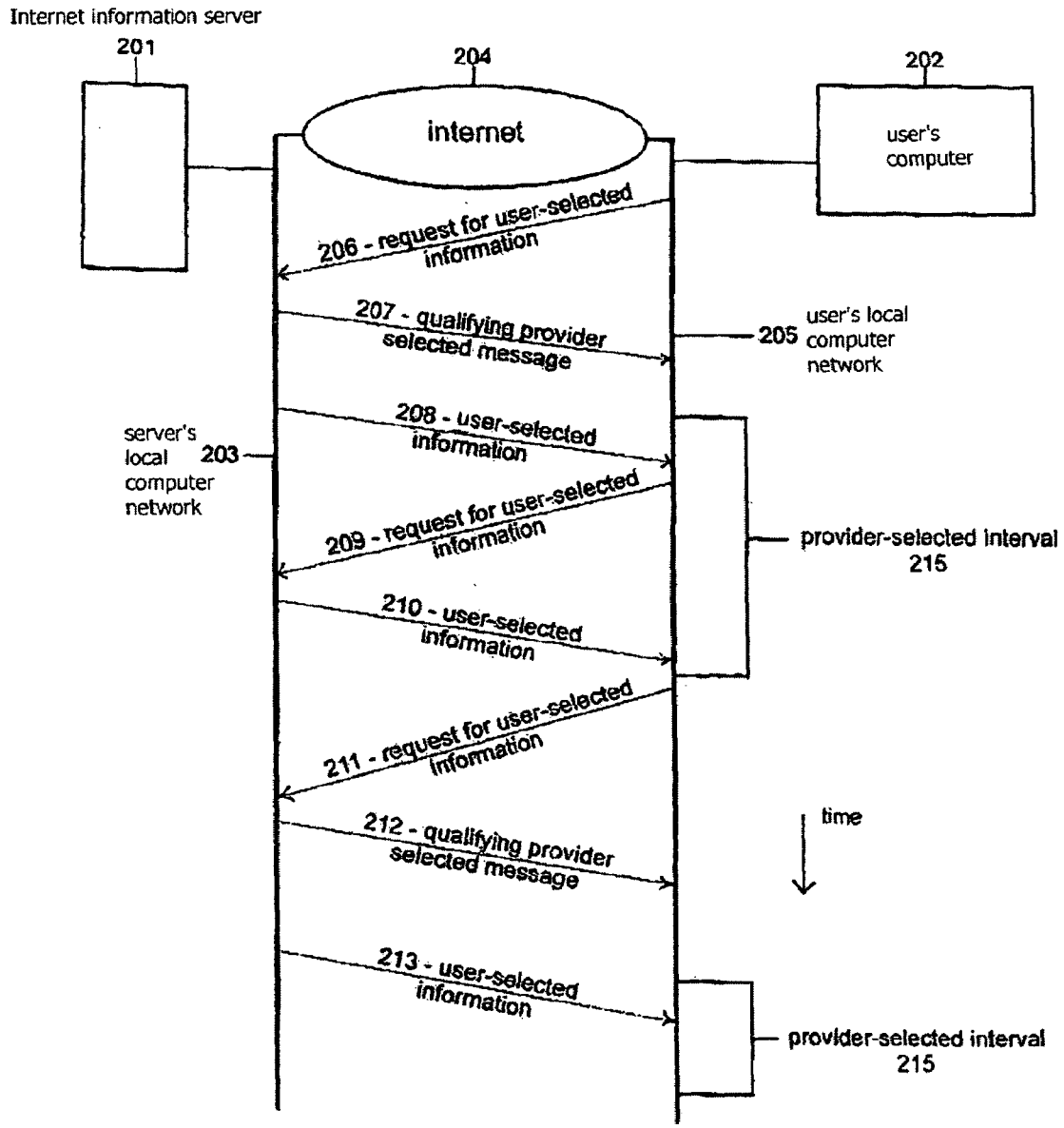
Figure 2:
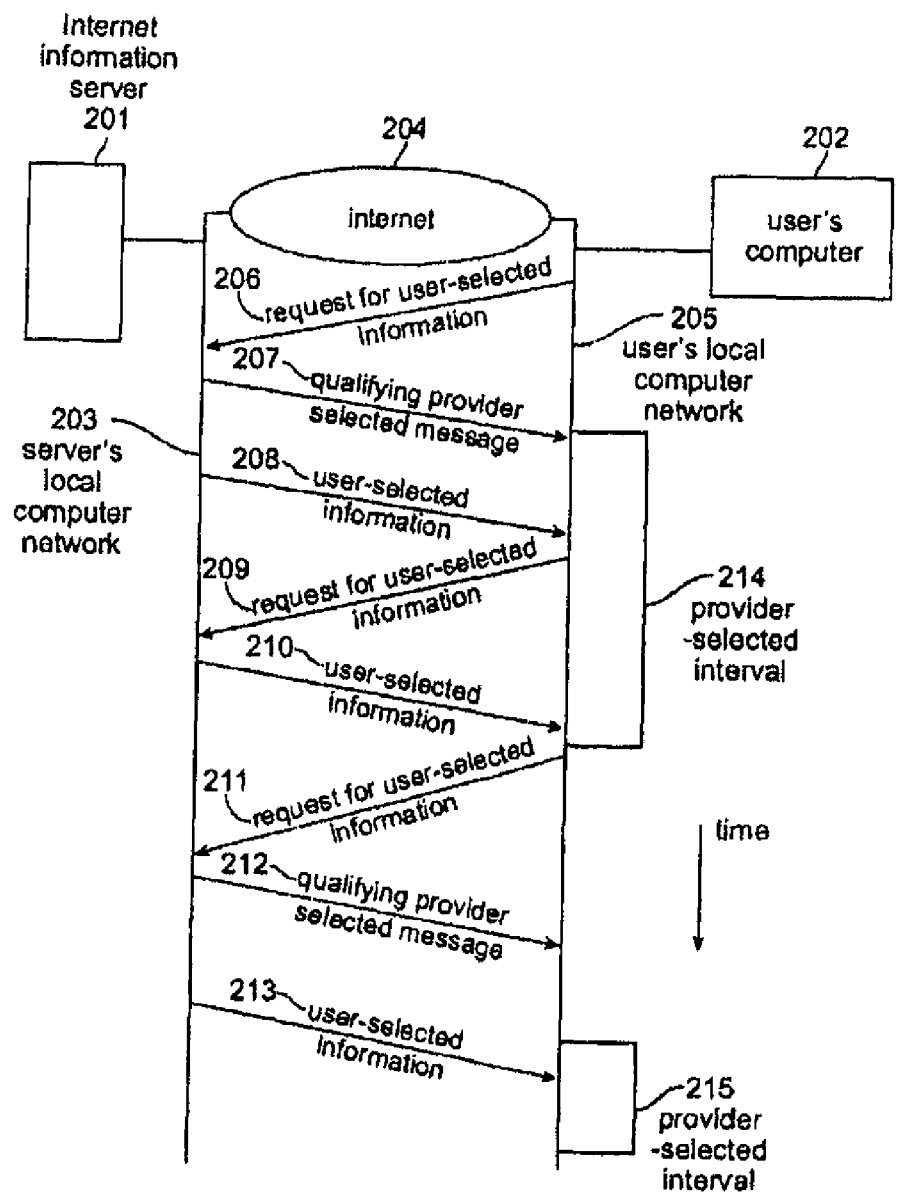

One form of exchange of requests and responses is also depicted in FIG. 2. Initially, a user's client program causes the user's computer 202 to transmit a first request for user-selected information 206 to the internet information server 201 via the user's local computer network 205, the Internet 204, and the local computer network 203 of the internet information server 201. After ascertaining that the user has not previously received a qualifying provider-selected message, the internet information server 201 responds to the user request by transmitting a qualifying provider-selected message 207 to the user's computer across the server's local computer network 203, the internet 204 and the user's local computer network 205.

After an appropriate period (determined by the server) of time, the user becomes qualified by virtue of having been sent a qualifying provider-selected message 207 (and perhaps fulfilling some additional conditions) within a provider-selected interval 214. The server 201 than transmits the requested user-selected information 210 to the user's computer.

The server responds to additional requests for user-selected information such as 209 received during a provider-selected interval 214 from a qualified user with user-selected information without transmitting a second qualifying provider-selected message. In a preferred embodiment, separate provider-selected intervals may be associated with each qualifying provider-selected message. Additional requests for user-selected information received outside of the provider-selected interval 214 such as 211 cause the transmission of another qualifying provider-selected message such as 212, and are followed additional provider-selected intervals such as 215. Such additional provider-selected intervals may be of varying lengths, and may begin after different periods of time following the transmission of an associated qualifying provider-selected message.

In a preferred embodiment, provider-selected messages are time-delimited and are displayed for only a limited period, after which user-selected information is automatically displayed.

For example, in a preferred embodiment, transmission of a qualifying provider-selected message may be followed after a limited display period by transmission of the original user-selected information. In one such embodiment, a qualifying provider-selected HTTP message is transmitted to a javascript-enabled browser such as Netscape 3.0. The HTTP message includes HTML and javascript which causes the provider-selected HTML to be displayed for a limited period, after which time the browser automatically requests the originally sought user-selected information from th provider's server which is then transmitted in response.

In a preferred embodiment, the user may be able to access other provider-selected information during the display of a time-delimited message, for example, by following a link provided in an HTML document included in the time-delimited message, but the user may not access the user-selected information.

A variety of other timed-delimited provider-selected message embodiments will be apparent to those skilled in the art. For example, a provider-selected interval during which a user is qualified to receive user-selected information may not begin until after the expiration of a minimum delay period. Such a qualifying provider-selected interval may be utilized with a provider-selected message that causes a user's browser to request user-selected information after displaying the provider-selected for a display period that exceeds the minimum delay period.

One such provider-selected message includes an HTML tag such as: <META HTTP_EQUIV="REFRESH" CONTENT="15; URL=http://www.provider.com/user-selected.html"> which causes the user's browser to request the information addressed by the URL http://provider.com/user-selected.html after displaying the parsed html page for 15 seconds. If the provider establishes a qualifying interval that begins fifteen seconds after the HTML message is received by the user, then the user will automatically receive user-selected information after the parsed HTML has been displayed for fifteen seconds. Moreover, the user will be unable to retrieve the user-selected content until such fifteen seconds has elapsed. Fifteen seconds is merely exemplary; any delay may be specified.

If no mininum delay is set on the server, time display messages can nevertheless be used. However, a user seeking to avoid the provider-selected message may be able to shorten the display period by directly entering or using a "bookmark" to request the user-selected information a second time immediately after the server transmits the provider-selected message.

The user's ability to bypass provider-selected messages for user-selected information with no minimum delay can be removed by transmitting user-selected information only in response to a request by the provider-selected message.

Commonly available browsers such as Netscape and Microsoft Internet Explorer use the HTTP GET request method for bookmarked requests. By transmitting user-selected information only in response to HTTP POST request methods, bookmarking of user-selected information can be avoided.

Nevertheless, it is possible with many browsers for a user to directly enter a request using the HTTP POST request method. While such a request typically cannot be bookmarked, if the user can type the request into the browser quickly enough, the display period could be shortened by manual entry of the POST request. This can be avoided by use of the referrer header. By transmitting user-selected information only in response to a POST request including a referrer header having the URL of the provider-selected message, the provider can prevent a user shorting the display period for the provider-selected message by bookmarking or manually entering the URL of the user-selected content.

In a preferred embodiment, these techniques may be combined to assure that a provider-selected message is actually displayed by a user's browser for a provider-selected display period before user-selected information is retrieved. In one such embodiment, a qualifying provider-selected HTTP message includes HTML and javascript which causes the provider-selected HTML to be displayed for a limited period, after which the browser automatically requests the originally sought user-selected information from the provider's server, using the HTTP Post request method. The provider's server transmits user-selected information only in response to such a request using the POST method, and which in addition includes a referrer header indicating that the referrer a URL for a qualifying provider-selected message. In combination with a qualification condition requiring, for example, that the last provider-selected message have been received within the last one-half hour, this embodiment would permit the provider to ensure that the user received and displayed a fifteen second commercial message during each half hour that the user requested information.

We claim:

1. A method of delivering information across a computer network, comprising the steps of:

receiving a request from a client program for user-selected information; and transmitting one of (a) only a provider-selected commercially-sponsored message to the client program for display, in response to the request, if no provider-selected commercially-sponsored message meeting a provider-selected criteria has been previously transmitted to the client program, or (b) only the user-selected information to the client program for display, if a provider-selected commercially-sponsored message meeting the provider-selected criteria has been previously transmitted to the client program;

wherein any provider-selected commercially-sponsored message meeting the provider-selected criteria comprises HTML and javascript which causes the provider-selected commercially-sponsored message meeting the provider-selected criteria to be displayed for a limited time period when it is transmitted, after which the client program automatically requests the user-selected information.

2. An apparatus for delivering information across a computer network, comprising:

a computer network; and an information server for receiving a request for user-selected information from a client program;

the server configured to transmit one of (a) only a provider-selected commercially-sponsored message to the client program for display, in response to the request, if no provider-selected commercially-sponsored message meeting a provider-selected criteria has been previously transmitted to the client program, or (b) only the user-selected information to the client program for display, if a provider-selected commercially-sponsored message meeting the provider-selected criteria has been previously transmitted to the client program;

wherein any provider-selected commercially-sponsored message meeting the provider-selected criteria comprises HTML and javascript which causes the provider-selected commercially-sponsored message meeting the provider-selected criteria to be displayed for a limited time period when it is transmitted by the server, after which the client program automatically requests the user-selected information from the server.

3. A method of delivering information across a computer network, comprising the steps of:

receiving a request from a client program for user-selected information; and transmitting one of (a) only a provider-selected commercially-sponsored message to the client program for display, in response to the request, if no provider-selected commercially-sponsored message meeting a provider-selected criteria has been previously transmitted to the client program within at least one provider-selected interval, or (b) only the user-selected information to the client program for display, if a provider-selected commercially-sponsored message meeting the provider-selected criteria has been previously transmitted to the client program within at least one provider-selected interval;

wherein any provider-selected commercially-sponsored message meeting the provider-selected criteria comprises HTML and javascript which causes the provider-selected commercially-sponsored message meeting the provider-selected criteria to be displayed for a limited time period when it is transmitted, after which the client program automatically requests the user-selected information.

4. An apparatus for delivering information across a computer network, comprising:

a computer network; and an information server for receiving a request for user-selected information from a client program;

the server configured to transmit one of (a) only a provider-selected commercially-sponsored message to the client program for display, in response to the request, if no provider-selected commercially-sponsored message meeting a provider-selected criteria has been previously transmitted to the client program within at least one provider-selected interval, or (b) only the user-selected information to the client program for display, if a provider-selected commercially-sponsored message meeting the provider-selected criteria has been previously transmitted to the client program within at least one provider-selected interval;

wherein any provider-selected commercially-sponsored message meeting the provider-selected criteria comprises HTML and javascript which causes the provider-selected commercially-sponsored message meeting the providers-selected criteria to be displayed for a limited time period when it is transmitted by the server, after which the client program automatically requests the user-selected information from the server.

5. The method of claim 1, wherein said request from said client program is by means of the Hypertext Transport Protocol.

6. The method of claim 1, wherein the commercially-sponsored message transmitted to the client program for display is formatted for display in a browser window.

7. The apparatus of claim 2, wherein the commercially-sponsored message tat the server is configured to transmit to the client program is formatted for display in a browser window.

8. The method of claim 3, wherein the commercially-sponsored message transmitted to the client program for display is formatted for display in a browser window.

9. The apparatus of claim 4, wherein the provider-selected commercially-sponsored message tat the server is configured to transmit to the client program for display is fonnatted for display in a browser window.

10. A method of delivering information across a computer network, comprising the steps of:

receiving a request from a client program for user-selected information; and transmitting one of (a) only a provider-selected commercially-sponsored message to the client program for display in a browser window associated with the client program, in response to the request, if no provider-selected commercially-sponsored message meeting a provider-selected criteria has been previously transmitted to the client program, or (b) only the user-selected information to the client program for display in a browser window associated with the client program, if a provider-selected commercially-sponsored message meeting the provider-selected criteria has been previously transmitted to the client program;

wherein any provider-selected commercially-sponsored message meeting the provider-selected criteria comprises HTML and javascript which causes the provider-selected commercially-sponsored message meeting the provider-selected criteria to be displayed for a limited time period when it is transmitted, after which the client program automatically requests the user-selected information.

11. The method of claim 10, further comprising the step of transmitting the user-selected information to the client program if the provider-selected commercially-sponsored message meeting the provider-selected criteria has been previously transmitted to the client program within at least one provider-selected interval.

\* \* \* \* \*

UNITED STATES PATENT AND TRADEMARK OFFICE
CERTIFICATE OF CORRECTION

| | | |
|---|---|---|
| PATENT NO. | : 7,110,962 B2 | |
| APPLICATION NO. | : 10/001761 | |
| DATED | : September 19, 2006 | |
| INVENTOR(S) | : Thomas C. Amon | |

It is certified that error appears in the above-identified patent and that said Letters Patent is hereby corrected as shown below:

Col. 1, line 59 replace "interact;" with --Internet--

Col. 4, line 1 replace "RTML" with --HTML--

Col. 5, line 62 replace "interact" with -- internet --

Col. 6, line 47 replace "from th" with -- from the --

Col. 10, Claim 9, line 2 replace "tat" with -- that --

Col. 10, Claim 9, line 3 replace "fonnatted" with -- formatted --

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,110,962 B2  
APPLICATION NO. : 10/001761  
DATED : September 19, 2006  
INVENTOR(S) : Thomas C. Amon et al.

Page 1 of 1

It is certified that error appears in the above-identified patent and that said Letters Patent is hereby corrected as shown below:

Col. 9, Claim 7, line 31 replace "tat" with --that--

Signed and Sealed this

Thirtieth Day of June, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,110,962 B2
APPLICATION NO. : 10/001761
DATED : September 19, 2006
INVENTOR(S) : Amon et al.

It is certified that error appears in the above-identified patent and that said Letters Patent is hereby corrected as shown below:

The title page showing the illustrative figure should be deleted to be replaced with the attached title page.

The drawing sheet, consisting of Fig. 2, should be deleted to be replaced with the drawing sheet, consisting of Fig. 2, as shown on the attached page.

Signed and Sealed this

Tenth Day of August, 2010

David J. Kappos
*Director of the United States Patent and Trademark Office*

CERTIFICATE OF CORRECTION (continued)

(12) United States Patent
Amon et al.

(10) Patent No.: US 7,110,962 B2
(45) Date of Patent: Sep. 19, 2006

(54) APPARATUS AND METHOD FOR PROVIDING A PROVIDER-SELECTED MESSAGE IN RESPONSE TO A USER REQUEST FOR USER-SELECTED INFORMATION

(76) Inventors: Thomas C. Amon, 2401 N. Fairmont, Santa Ana, CA (US) 92706; Dan M. Baer, 417 E. 22nd St., Santa Ana, CA (US) 92706

( * ) Notice: Subject to any disclaimer, the term of this patent is extended or adjusted under 35 U.S.C. 154(b) by 638 days.

(21) Appl. No.: 10/001,761

(22) Filed: Oct. 31, 2001

(65) Prior Publication Data

US 2004/0111463 A1    Jun. 10, 2004

Related U.S. Application Data

(63) Continuation of application No. 08/912,991, filed on Aug. 11, 1997, now abandoned.

(51) Int. Cl.
    G06Q 30/00      (2006.01)
    G06F 15/16      (2006.01)

(52) U.S. Cl. .................................. 705/14; 709/219
(58) Field of Classification Search .............. 705/14, 705/10; 709/227, 219, 203
See application file for complete search history.

(56) References Cited

U.S. PATENT DOCUMENTS

| | | | |
|---|---|---|---|
| 5,305,195 A | | 4/1994 | Murphy ....................... 364/401 |
| 5,347,632 A | | 9/1994 | Filepp et al. ................ 398/200 |
| 5,572,643 A | * | 11/1996 | Judson ........................ 709/218 |
| 5,657,390 A | * | 8/1997 | Elgamal et al. ............. 713/151 |
| 5,708,780 A | * | 1/1998 | Levergood et al. ......... 709/229 |
| 5,724,521 A | * | 3/1998 | Dedrick ....................... 705/26 |
| 5,732,219 A | | 3/1998 | Blumer et al. ......... 395/200.57 |
| 5,745,681 A | | 4/1998 | Levine et al. ............ 395/200.3 |
| 5,751,956 A | | 5/1998 | Kirsch .................... 395/200.33 |
| 5,761,683 A | | 6/1998 | Logan et al. ................ 707/513 |
| 5,848,396 A | | 12/1998 | Gerace ......................... 705/10 |
| 5,875,296 A | | 2/1999 | Shi et al. ................ 395/188.01 |
| 5,878,213 A | * | 3/1999 | Bittinger et al. ............ 709/203 |
| 5,933,811 A | * | 8/1999 | Angles et al. ................ 705/14 |
| 5,937,392 A | * | 8/1999 | Alberts ........................ 705/14 |
| 5,948,061 A | | 9/1999 | Merriman et al. .......... 709/219 |
| 5,974,451 A | * | 10/1999 | Simmons .................... 709/218 |
| 6,134,592 A | | 10/2000 | Montulli ..................... 709/229 |
| 6,148,332 A | * | 11/2000 | Brewer et al. .............. 709/218 |
| 6,195,649 B1 | | 2/2001 | Gifford ........................ 705/75 |

FOREIGN PATENT DOCUMENTS

| | | |
|---|---|---|
| WO | WO 96/39668 | 12/1996 |
| WO | WO97/21183 | * 6/1997 |

OTHER PUBLICATIONS

Answers.com; intersitial ad and Supersitial; Oct. 26, 2005.*
Keane, Patrick. In the Face of Shrinking Nielson Ratings, Major Television Networks Need to Re-Evaluate Online Goals. www.jupiter.com. Jun. 2, 1997.

(Continued)

Primary Examiner—Dung C. Dinh
Assistant Examiner—Sean Reilly
(74) Attorney, Agent, or Firm—Vista IP Law Group LLP

(57) ABSTRACT

A method of delivering information across a computer network includes receiving a request from a client program for user-selected information, and transmitting provider-selected information in response to the request if no qualifying provider-selected message has been previously transmitted to the client program.

11 Claims, 2 Drawing Sheets

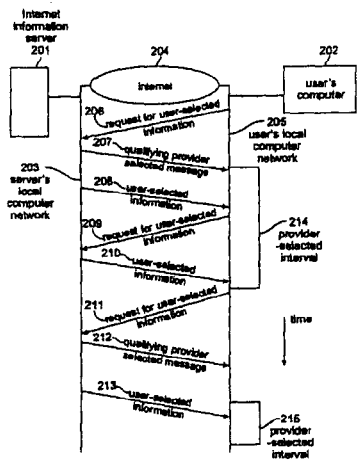

UNITED STATES PATENT AND TRADEMARK OFFICE
CERTIFICATE OF CORRECTION

PATENT NO.         : 7,110,962 B2
APPLICATION NO.    : 10/001761
DATED              : September 19, 2006
INVENTOR(S)        : Amon et al.

It is certified that error appears in the above-identified patent and that said Letters Patent is hereby corrected as shown below:

Col. 2, Line 16, replace "massaging" with --messaging--; Line 25, replace "massaging" with --messaging--
Col. 3, Line 29, replace "Java" with --JAVA language--; Line 30, replace "JavaScript" with --JAVASCRIPT language--; Line 66, replace "massaging" with --messaging--
Col. 5, Line 46, replace "1" with --2--; Line 47, replace "101" with --201--; Line 49, replace "pentium" with --PENTIUM--; Line 53, replace "103" with --203--
Col. 5, Line 54, replace "104" with --204--
Col. 5, Line 54, replace "102" with --202--
Col. 5, Line 56, replace "pentium" with --PENTIUM--
Col. 5, Line 60, replace "105" with --205--
Col. 5, Line 60, replace "104" with --204--
Col. 5, Line 61, replace "103" with --203--
Col. 5, Line 61, replace "105" with --205--
Col. 5, Line 62, replace "104" with --204--
Col. 5, Line 62, replace "101" with --201--
Col. 5, Line 64, replace "102" with --202--
Col. 6, Line 1, between "request" and "for", insert --206--
Col. 6, Line 2, delete "206"
Col. 6, Line 17, replace "210" with --208--
Col. 6, Line 20, replace "such as 209" with --(such as request 209--
Col. 6, Line 21, replace the first instance of "user" with --user)--
Col. 6, Line 22, between "information" and "without", insert --210,--
Col. 6, Line 29, between "followed" and "additional," insert --by--
Col. 6, Line 43, replace "javascript" with --JAVASCRIPT--
Col. 6, Line 44, replace "javascript" with --JAVASCRIPT--
Col. 7, Line 38, replace "shorting" with --from shortening--
Col. 7, Line 54, between "referrer" and the first instance of "a," insert --is--
Col. 7, Line 57, replace "have" with --has--

Signed and Sealed this

Second Day of November, 2010

David J. Kappos
*Director of the United States Patent and Trademark Office*